United States Patent Office 3,027,249
Patented Mar. 27, 1962

3,027,249
PROCESS FOR IMPROVING STORAGE PROPERTIES AND POURABILITY OF HYGROSCOPIC FERTILIZERS
Walter Jost, Hemberg 1, In der Calle Uber Iserlohn, Germany
No Drawing. Filed May 13, 1957, Ser. No. 658,533
Claims priority, application Germany May 15, 1956
1 Claim. (Cl. 71—64)

Many of the known fertilizer salts, e.g. ammonium nitrate, calcium-ammonium nitrate, ammonium sulfate-nitrate, potassium ammonium nitrate, ammonium sulfate, potassium fertilizers, calcium nitrate, Chile nitrate, urea- or ammonium nitrate-containing mixed and pure fertilizers, and so on, have the inconvenience of caking, particularly when stored in moist air, and of forming balls, lumps or hard masses, whereby they lose their pourability. These salts have to be disintegrated, comminuted, screened and brought into pourable shape, whereby considerable amounts of operational time, equipment and costs are required.

In the fertilizer industry, the drawbacks incurred by the agglomeration of fertilizer salts, or the mixed and pure fertilizers have been avoided, up to the present, by superficially coating the fertilizers, before storing or shipping, with small amounts, generally from 3-6%, of an inert powder. The powder forms a dense sheathing on the fertilizer grain or granulate, which protects the enclosed fertilizer grains against the action of moisture in the air and prevents their caking when stored in large masses.

Many inert powders have been used for practical purposes up to now. Favorites are limestone, calcium carbonate, different clays, kieselguhr powder, powdered slate, talcum, gypsum, finely ground blast furnace slags, mineral powders, dolomite, silicates and similar materials.

It has become known in the last decades, that many soils contain a shortage in "trace elements," and exhibit decreasing yields to an extraordinary extent. It has been attempted to use as powders materials containing a small amount of trace elements. Endeavors were made in this manner to condition the soil to a better state and to secure increased harvests, while at the same time avoiding harmful effects to the grazing herds. Since materials such as limestone, clays, powdered slate, kieselguhr, powdered slag and minerals, or the like, contain only small amounts of the above-named nutrient trace elements, which are only incidentally present, the mentioned dosage was insufficient for bringing about satisfactory fertilization of tilled soils with micro nutrients.

There are a number of known macro-nutrient-containing fertilizers such as superphosphates, Chile nitrate, and Thomas meal, which contain likewise trace elements, e.g. boron and manganese. Although it is possible that in analysis Chile nitrate may have shown boron, and Thomas meal manganese, the absorptive capacity for these micro-nutrients is in many cases doubtful. Manganese in Thomas meal, for instance, is present in the form of slag and it is therefore very unlikely that the intended effect of a fertilization with micro-nutrients can be brought about with this material, particularly in view of the fact that the metal is easily affixed to the soil. This assumption is supported by the fact that in spite of use of Thomas meal for decades, there exists an increasing amount of soil deficiency in manganese.

In order to accomplish the desired ends, namely to protect the basic fertilizers by powdering them with inert substances in order to protect them against moisture, while on the other hand using such powders which contain the desired micro-nutrients, it has been suggested to mix metal salts with the inert substances. Another proposal was to add such metal sulfates in solution during the manufacture of the macro-nutrient-containing fertilizer.

While it is obvious that the last-mentioned methods spell a considerable advancement in the use of essential micro nutrients, since one does no longer depend on the incidental presence of the desired substances, experience over years has shown that even such metal salts may be harmful, contrary to the so-called alloy fertilizers, which are melted together for the purpose in question.

These metal sulfates are highly water-soluble and may therefore have toxic effects. Furthermore, they are easily washed down by rain and snow into depths of soil where they are no longer accessible for the roots of the plants. Also, such metal salts contain the desired metals in low amounts. As compared with these salts, the above-mentioned alloy fertilizers have proved to be by far superior as regards fertilization by micro-nutrients, since they do not only contain one, but several metals.

The plurality of metals in an alloy fertilizer exhibits the following advantages in micro-fertilization, as compared to metal sulfates, the following discussion being held with reference to soils deficient in copper and micro-nutrients relating thereto.

(1) They generally contain, in addition to copper, zinc, which is an activator for copper.
(2) In alloy fertilizers there is also a number of other important metals incorporated, such as Mn, Mo, W, Fe, Co, and others.
(3) For making the alloy fertilizers mostly residues from metal working industries are used. This means that not only the important supply is assured, but it also means that the residues may be sold at a favorable price.
(4) Such alloy fertilizers exclude any incidence of toxicity.
(5) By mixing the metal residues from the metal working industries, not only water-soluble neutral metal salts are formed by the interaction of ammnoium sulfates or potassium fertilizer, but in addition basic salts are likewise formed. Moreover, smallest metal particles may remain in the core of the metal salts, whereby an ideal degradation of the metal fertilizers is assured in the following order: Easily water-soluble salts, basic salts, and finest metallic particles.

For the first year sufficient metal ions are set free and the basic salt will only be converted into the ionized state in the second or third year, whereas the minute metal particles in the core will only be converted into ions as time passes by in accordance with the conditions of the soil.

It is the object of the present invention to provide a process for improving the storage properties and pourability of hygroscopic fertilizers and to avoid their caking, while at the same time not only protecting the fertilizer salts but also furnishing a supply of sufficient micro nutrients in tilled soils.

This is accomplished according to the invention by applying as coating powders in a finely comminuted form, on the above mentioned hygroscopic fertilizer salts metal-containing manufacturing wastes of the metal-working industries having high contents, up to 25-72%, of trace elements: more particularly useful are: foundry wastes, ballmill dusts, polishing dust from brass and cast iron works, as they are obtained in grinding and polishing plants, and hammer scales of copper. The caking of the fertilizer salts forming lumps, balls or hard masses is thereby prevented, the single granular fertilizer pellet remains intact and retains its pourability and storability. At the same time the fertilizers contain a very effective amount of micro-nutrient fertilizers (trace element fertilizers) which is furnished to the soil and to the plants in one operation with the application of the fertilizer. The coating of the fertilizer salts with inert powders which is necessary in any case, is therefore utilized to feed into the soil and to the plants the necessary trace elements in accurately dosaged and effective form. This is the result of using, according to the invention, manufacturing residues with high contents in trace elements.

Before describing in detail the practical application of the process according to the invention in the fertilizing industries, it is necessary briefly to discuss the industrial wastes which may be of interest.

Metal wastes are formed in many operations of the metal working industry. This applies to copper as well as to steel. When these metals are smelted in the foundry, the impurities rise to the top of the melts forming slags and dross. The last-mentioned materials contain the metal in the form of small globules and sprays called granulated metal. Taking as an example, in the following, the copper industry, apart from copper a large number of other metals are obtained alloyed to copper. Such foundry wastes contain among others up to 40% copper and more. Such slags may be ground in mills whereby a so-called "ballmill dust" is obtained which contains up to 35% copper, 19% Zn, a few percent Fe, Mn, some lime and some silicates, when brass was used as a waste material.

The granulated metals contained in these slags, in as much as they are not added to the product to be used according to the invention by fine screening—thus being of coarser grain size—are periodically removed from the grinding drum.

The fine ballmill dust obtained as described is very well suited for powdering fertilizer salts since in addition to the metals there is some finely ground slag dust present.

In further steps of the metal working industries apart from the turnings formed—principally in polishing plants and in the so-called band-grinding plants, shavings are obtained which due to their origin exhibit a larger surface which is of value for the purpose in question. Such metal turnings or polishing dusts contain about 55% copper and 18% zinc, and according to the material used in smelting, Fe and Mn and other metals.

As may be seen from the above, the desired Cu and Zn are obtained in considerable amounts in the wastes mentioned above; another waste product of the copper working industries is obtained in rolling or drawing of copper sheets and copper pipes. This waste material, called copper hammer scale, contains copper in an amount up to 84%. Since this is an oxide it is very favorable since it may be easily comminuted by known technical grinding and mixing operations for making it useful in the present process. It should be noted that in the production of special steels of high quality, the same operations are used and it is therefore possible to add some wastes from the steel industry with the wastes of the copper industry where it is essential to have trace elements such as Co, Mo, V, W or Ti present.

Metal residues to be used are mixed with the main fertilizer before the treatment so that the desired storability and fastness against moisture from the air will be attained while at the same time essential nutrients from trace metals will be furnished in accurately dosaged amounts for the deficient soil.

A few examples will now be given for illustrating the treatment according to the invention, but it should be understood that these are not given by way of limitation and that many changes can be made in the details without departing from the spirit of the invention.

In the treatment of the fertilizer salts, the requirements in N and Cu are preferably considered.

Cereals are usually fertilized with about 52 kg. pure N/ha., hoed vegetables with about 78 kg. pure N. Copper is furnished according to the requirements of the soil.

In this respect distinction is made between (a) A prophylactic fertilization, e.g. for light sandy soil where a latent deficiency in copper may be present; in this case about 1 kg. pure copper/ha. is added;
(b) Fertilization of soils on a borderline, i.e. where the soil is about in between a sound and a deficient soil and where already low crops show the deficiency; in this case about 2 kg. pure copper/ha. are given;
(c) Fertilization of true deficient soils which are diseased (e.g. by "white disease" which occurs on heathy ground) and which have a yield in oats down to zero; in this case about 4 kg. pure copper/ha. are given.

The fertilization can take place with all the main fertilizers mentioned in the beginning, for instance Calcium ammonium nitrate with about 20.5% N
Ammonium sulfate nitrate with about 26% N
Calcium nitrate with about 15.5% N
Pure, full value fertilizers—NKP 13/13/24

Thomas potassium (10/20), may likewise be protected by powdering according to the invention. In order to fill all the specifications which may be made for fertilizers, the latter have to be coated with different ones of the above-named manufacturing wastes. There thus exists the possibility of bringing about the desired enrichment with trace nutrients in highly concentrated form; when the plants are already diseased, as mentioned above, this is of great importance. In case a prophylactic fertilization is to be effected, industrial wastes with lower contents may be used.

The term "prophylactic fertilization," as employed in this application, denotes a preventive fertilization, i.e., the addition of a given amount of fertilizer which is expected to be deficient in the next year or years in anticipation and for the prevention of such deficiencies.

In the following, two examples are given which may of course be modified in several respects. In the first instance, the metal powder consists of about 72% Cu, derived from industrial wastes and this product is designated by $a$. The second product contains 25% Cu and is designated by $b$.

[Main fertilizer—1000 kg. are to be powdered, as indicated below, with metal powder $a$ or $b$ respectively, amounts being indicated in kg.]

| | percent Cu | $a$ | $b$ | percent Cu | $a$ | $b$ |
|---|---|---|---|---|---|---|
| Calcium ammonium nitrate | 0.40 | 5,552 | 16,000 | 1.20 | 16,656 | 48,000 |
| ammonium sulfate nitrate | 0.50 | 6,940 | 20,000 | 1.00 | 13,880 | 40,000 |
| calcium nitrate | 0.30 | 4,164 | 12,000 | 0.90 | 12,492 | 36,000 |
| full value frtilizer NPK 13/13/21 | 0.25 | 3,470 | 10,000 | 0.75 | 10,410 | 30,000 |
| Thomas potassium (10 x 20) salt | 0.25 | 3,470 | 10,000 | 0.75 | 10,410 | 30,000 |

The process is carried out in practice in the conventional manner used in the fertilizer industry, where fertilizer salts are powdered. For instance, the granulated, grain size, or drop-shaped fertilizer salts or mixed fertilizers, having been brought into pourable granular shape, are coated with the powdered industrial wastes in granulating drums, rotating drums, mixing devices, mixing conveyers, granulating discs, spraying towers, and similar devices. This may be done by dusting, with pressure, tumbling, rolling and similar measures; the granules or globules of the fertilizer salts, while warm and moist, are coated with the powder of the manufacturing wastes which adhere thereto intimately and form with them an integral thin surface layer. A preferred manner of coating of the moist warm fertilizer granulates is effected in rotary tubes, on granulating discs, and in sprinkling towers during the free drop of the fertilizer grains, drops or crystals.

When dry salts are used, they may be moistened with atomized water, steam, solutions of fertilizer salts or adhesives for better adherence to the surface of the industrial wastes.

However, it is not absolutely necessary to carry out this moistening since the metals and metal compounds contained in the wastes are converted into metal salts with the ammonium sulfates or the potassium fertilizer, or other mixed fertilizer, and the moisture of the air is sufficient. By the coating thus formed, the enclosed fertilizer granules, globules or crystals are protected against further impairment by air.

The amounts of industrial wastes used for coating the fertilizers may be varied in wide limits according to the requirements in practice. Usually quantities from 3–6% are sufficient; however, if necessary quantities from 6–10% may be used. As regards materials, all the industrial wastes mentioned above may be used in a finely pulverized state.

While up to now such wastes were discussed in which the trace element copper is present in high amounts, this does not mean that other residues in which for instance Mn and Zn are predominantly present, could not be used for the purposes of this invention. It should be understood that all these wastes have to be well comminuted in order to be present as powders.

Obviously, such materials may also be used, which are not generally designated as industrial wastes, since they have been made by metallurgical processes. Metals may also be used which have not yet been perfectly and completely refined. It may be mentioned for instance that in a blast furnace process manganese is smelted from ores and materials containing the same. In the refining process, a so-called "blast furnace manganese" is obtained, which in general cannot be used for technical purposes. Such a blast furnace manganese contains about 74–75% Mn and in addition thereto considerable amounts of impurities which, in general, have to be removed so that the ferro manganese may be used in steel refineries for alloying with special high-grade steels.

This blast furnace manganese may very well be used for the purposes of the invention, after it has been comminuted, which can be easily done, since the alloy is very brittle. Other components present, such as about 0.20% S, about 7% C, about 1.9% Si, about 1.15% P and the remainder Fe, are desirable anyhow in the use as trace element fertilizers.

There are similar possibilities in smelteries. In these, too, metal alloys are often obtained which are so impure, from a metallurgical point of view, that they cannot be profitably used where no blast furnace operation takes place. For instance in zinc smelteries, in addition to zinc dross, zinc dust is obtained which is an ideal agent for fertilizing soils deficient in zinc.

By applying the above described method of the invention, it is therefore possible, to prevent caking of the fertilizers, to improve their storability and pourability and to incorporate therein in the same operation, the necessary trace elements (micro-nutrients) for soil and plants.

The method according to the invention therefore spells a considerable improvement in the art of fertilizer manufacture. Means and ways are shown in order to effect the desired improvements of properties, namely storability and pourability, to prevent caking of the hydroscopic fertilizer salts, while at the same time adding thereto, in one operation, the essential micro-nutrients necessary for a well balanced fertilizing process.

It is another advantage that the industrial wastes, used in accordance with the invention are not only inexpensive, but are available as starting materials in large quantities.

It is a further advantage of the method according to the invention as regards the supply of materials in deficient soils, that not only the missing main component, but also a plurality of other metals, which are likewise necessary in overcoming the deficiencies, are added simultaneously. Moreover, the metal wastes covering the fertilizer salts, are converted thereon, by chemical reaction and by the water- and $CO_2$-contents in the air, as well as by the moisture of the soil, into water-soluble and basic metal salts which are readily absorbed by the plants. The fertilizer salts treated according to the invention therefore represent a fast-acting source of trace elements of lasting efficiency both for the plants and for the tilled soil.

What I claim is:

A process for improving the storability and pourability of fertilizer salt granules, selected from the group consisting of the phosphates, nitrates and sulfates of calcium, sodium, potassium, urea and mixtures thereof, and for simultaneously imparting to said fertilizer salt trace elements selected from the group consisting of copper and zinc, which consists of comminuting industrial wastes containing said trace elements in amounts of at least 20 percent and up to 72 percent to a fine powder, and coating the surfaces of said fertilizer salt granules with said powder without using any binder, said coating amounting to 3–10 percent of the fertilizer salt granules, whereby said granules are made water-repellent.

References Cited in the file of this patent

UNITED STATES PATENTS

| | | |
|---|---|---|
| 2,280,451 | Riddle | Apr. 21, 1942 |
| 2,399,987 | Cordie et al. | May 7, 1946 |
| 2,403,419 | Wilkens et al. | July 2, 1946 |
| 2,702,747 | Studebaker | Feb. 22, 1955 |
| 2,806,773 | Pole | Sept. 17, 1957 |
| 2,829,040 | Darin et al. | Apr. 1, 1958 |